(12) United States Patent
Chen

(10) Patent No.: US 11,232,693 B2
(45) Date of Patent: Jan. 25, 2022

(54) HELP-SEEKING METHOD AND SYSTEM FOR INDOOR CARE

(71) Applicant: GUANGZHOU SAFENC ELECTRONICS CO., LTD., Guangzhou (CN)

(72) Inventor: Zhiyong Chen, Guangzhou (CN)

(73) Assignee: GUANGZHOU SAFENC ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 16/847,915

(22) Filed: Apr. 14, 2020

(65) Prior Publication Data

US 2020/0242908 A1 Jul. 30, 2020

Related U.S. Application Data

(63) Continuation of application No. PCT/CN2018/084154, filed on Apr. 24, 2018.

(30) Foreign Application Priority Data

Apr. 3, 2018 (CN) .......................... 201810288863.1

(51) Int. Cl.
  *G08B 21/04* (2006.01)
  *H04W 4/33* (2018.01)
  *H04W 4/90* (2018.01)

(52) U.S. Cl.
  CPC ....... *G08B 21/0469* (2013.01); *G08B 21/043* (2013.01); *G08B 21/0415* (2013.01);
  (Continued)

(58) Field of Classification Search
  CPC ........ A61B 2503/08; A61B 2560/0242; A61B 2562/0204; A61B 2562/0219;
  (Continued)

(56) References Cited

U.S. PATENT DOCUMENTS

| 5,905,436 A | 5/1999 | Dwight et al. |
| 8,810,718 B1 * | 8/2014 | Cuddeback ........ H04N 5/23245 348/371 |

(Continued)

FOREIGN PATENT DOCUMENTS

| CN | 101587624 A | 11/2009 |
| CN | 101782661 A | 7/2010 |

(Continued)

OTHER PUBLICATIONS

First Office Action and Search Report dated Jul. 3, 2020, issued in Chinese Application No. 201910262627.7, filed Apr. 2, 2019, 41 pages.

(Continued)

*Primary Examiner* — Omeed Alizada
(74) *Attorney, Agent, or Firm* — Christensen O'Connor Johnson Kindness PLLC

(57) ABSTRACT

A help-seeking method and system for indoor care are provided. A presentation information code is obtained through the acquired human body presentation information in each preset height section, and a help-seeking message is generated when a duration in which the presentation information code matches a target code is greater than a time threshold corresponding to the target code. All possible behavioral postures of a human body in daily activities are converted into and represented by respective target codes, and the target codes are associated with time and preset in the system. By recording duration in which the human body presentation information code for an elder during indoor activities matches the corresponding target code, a help-seeking message can be generated for an abnormal situation in which the duration of a behavioral posture is greater than the time threshold for the matched target code.

21 Claims, 10 Drawing Sheets

(52) U.S. Cl.
CPC .......... *G08B 21/0476* (2013.01); *H04W 4/33* (2018.02); *H04W 4/90* (2018.02)

(58) Field of Classification Search
CPC ............ A61B 2562/0223; A61B 5/002; A61B 5/0022; A61B 5/0024; A61B 5/01; A61B 5/02438; A61B 5/1112; A61B 5/1117; G08B 13/1618; G08B 13/2491; G08B 21/0423; G08B 21/043; G08B 21/0438; G08B 21/0446; G08B 21/0469; G08B 25/006; G08B 25/009; G16H 50/20; G16H 50/70; G16H 80/00
See application file for complete search history.

(56) References Cited

U.S. PATENT DOCUMENTS

| | | | |
|---|---|---|---|
| 2007/0075860 A1 | 4/2007 | Tracey | |
| 2011/0260880 A1* | 10/2011 | Dean | F21L 4/08 340/686.1 |
| 2012/0116252 A1* | 5/2012 | Newman | A61B 5/1117 600/587 |
| 2013/0184592 A1* | 7/2013 | Venetianer | G08B 21/043 600/476 |
| 2016/0328941 A1* | 11/2016 | Sundholm | G08B 25/006 |
| 2018/0137735 A1 | 5/2018 | Matsuoka et al. | |

FOREIGN PATENT DOCUMENTS

| | | |
|---|---|---|
| CN | 103295364 A | 9/2013 |
| CN | 203289562 U | 11/2013 |
| CN | 204926413 U | 12/2015 |
| CN | 105931171 A | 9/2016 |
| CN | 105934781 A | 9/2016 |
| CN | 206236248 U | 6/2017 |
| EP | 0452194 A1 | 10/1991 |
| EP | 3163545 A1 | 5/2017 |
| FR | 2920575 B3 | 12/2009 |
| JP | 3887646 B2 | 2/2007 |
| WO | 2013014578 A1 | 1/2013 |
| WO | 2016/170231 A1 | 10/2016 |
| WO | 2017/002219 A1 | 1/2017 |
| WO | 2017/146643 A1 | 8/2017 |
| WO | 2017/182712 A1 | 10/2017 |

OTHER PUBLICATIONS

First Office Action dated Mar. 25, 2019, issued in Chinese Application No. 201810288863.1, filed Apr. 3, 2018, 32 pages.
International Search Report dated Jan. 3, 2019, issued in International Application No. PCT/CN2018/084154, filed Apr. 24, 2018, 2 pages.

* cited by examiner

HELP-SEEKING METHOD AND SYSTEM FOR INDOOR CARE

CROSS-REFERENCE TO RELATED APPLICATIONS

This application is a continuation of International Patent Application No. PCT/CN2018/084154 filed on Apr. 24, 2018, and claiming priority to Chinese Patent Application No. 201810288863.1 filed on Apr. 3, 2018, all of which are incorporated herein by reference for all that they teach and disclose without exclusion of any portion thereof.

TECHNICAL FIELD

The present disclosure relates to the technical field of intelligent care, and more particularly, to a help-seeking method and system for indoor care.

BACKGROUND

The probability of an elder experiencing an emergency in daily life far exceeds that of a young person. Common emergencies include accidental falls, movement difficulties caused by sudden physical discomfort or abnormal pain, or the like. In a case where the aforementioned emergency appears indoor, such as in a home, or an apartment for the elder, and there is no other people in the scene, if there is a kind of auxiliary/facility that can detect the abnormal situation in which an elder is in trouble, and tell family members or caregivers in a custody service agency at the first time to check or determine the abnormal situation so that the family members or caregivers can arrive at the scene to provide help in time, the safety insurance of the elder while living alone will be effectively improved.

The care technology currently used to help an elder to seek help in the event of an emergency, if not considering the professional device used in professional care places, mainly includes a wearable wireless device, a fastened or portable wireless (remote control) caller and an alarm device with an infrared probe disposed indoor to detect falling of a human body, and video monitoring. However, existing lightweight wireless wearable devices, such as wristbands, cannot correctly identify whether the human body is in a movement difficulty. Instead, it relies on the user to perform an emergency call operation by himself/herself Such wearable device generally have a poor battery life so it needs to be removed frequently for charging and cannot guarantee an elder to wear for a long time and perform the call operation at any time. On the other hand, a wearable device with certain care abilities is too large so as to hinder physical activities and has restrictions on user behaviors, so it is not suitable for a wide range of life scenes. In an emergency, such as physical discomfort, difficulty in action or even ambiguity during bathing, it is more difficult for an elder to seek for a non-wearing fastened talker or a portable remote control to call for help. Moreover, for indoor video surveillance, it is difficult to be adapted since it may be obviously contrary to ethics to monitor all life behaviors of an elder throughout the day, even if it does not rely on manual real-time observation, but relies on image analysis and estimation with artificial intelligence in the future. As for a single monitoring method of falling (such as the one disclosed in CN103295364A) in which the human body activity is simultaneous detected at both high and low levels using passive infrared probes, and an alarm is generated considering that there is a fall as long as there is human body activity of high and low levels changing to human body activities of only low levels, it also has drawbacks. For example, if the limb has no noticeable activity to be detected by the low level infrared probe over 30 seconds at the early fall, it is considered that the person has left the scene and the fall monitoring is turned off, and no matter how long the faller struggles. In this case, there will be no alarm, unless the faller climbs up so that the high and low probes detect the physical activity to restart the monitoring of the fall phenomenon. In addition, the interference caused by the activities of the pets like cats and dogs on the ground cannot be avoided.

In summary, the current various kinds of help-seeking technologies for indoor care have such shortcomings in face of actual needs.

SUMMARY

Accordingly, it is necessary to provide a help-seeking method and system for indoor care as perfection and supplement to address the drawbacks in the current help-seeking technologies for indoor care. The help-seeking method and system for indoor care provided herein can find various abnormal situations appearing in indoor personal activities more quickly and effectively and report, and maintain the user's life privacy, without wearing by the user or operation from the user.

The technical solutions according to the present disclosure are described as follows:

A help-seeking method for indoor care is provided, including:

acquiring human body presentation information in each preset height section;

obtaining a presentation information code according to the human body presentation information in each preset height section;

recording a duration in which the presentation information code is in a matching state with a target code;

generating a help-seeking message if the duration is greater than a time threshold corresponding to the target code.

A help-seeking device for indoor care is also provided, including:

a presentation information acquiring module, configured to acquire human body presentation information in each preset height section;

a presentation information encoding module, configured to obtain a presentation information code according to the human body presentation information in each preset height section;

a time recording module, configured to record a duration in which the presentation information code is in a matching state with a target code;

a help-seeking message sending module, configured to generate a help-seeking message when the duration in which the presentation information code is in a matching state with the target code is greater than a time threshold corresponding to the target code.

A computer device is further provided, including a memory, a processor and a computer program stored on the memory, the computer program being executable by the processor and when executed, causing the processor to implement the above help-seeking method for indoor care.

A computer-readable storage medium is further provided. The computer-readable storage medium stores a computer program that, when executed, cause a processor to implement the above help-seeking method for indoor care.

A detecting pile is further provided, including: a detecting pile support; and at least one detecting units disposed on the detecting pile support. Each of the detecting units is configured to detect human body presentation information for a corresponding preset height section.

A help-seeking system for indoor care is further provided, including a first processing unit, a first communication unit and the above detecting pile. The first processing unit is disposed on the detecting pile support and connected to the at least one detecting unit on the detecting pile support respectively. The first processing unit is connected to the first communication unit. The first communication unit is disposed on the detecting pile support. The first processing unit is configured to obtain a presentation information code according to human body presentation information in each preset height section, and transmit out the presentation information code through the first communication unit.

The first processing unit is further configured to record the duration in which the presentation information code is in a matching state with the target code when the presentation information code is in the matching state with the target code. The first processing unit is also configured to generate a help-seeking message and send out the help-seeking message through the first communication unit when the duration is greater than the time threshold corresponding to the target code. The duration threshold corresponds to the target code.

A help-seeking system for indoor care is further provided, including a second processing unit, a second communication unit and the above detecting pile. The second processing unit is connected to the second communication unit and the at least one detecting unit respectively. The second processing unit is configured to collect the presentation information code transmitted by the first communication unit, record a duration in which the presentation information code is in a matching state with the target code, generate a help-seeking message when the duration is greater than a time threshold corresponding to the target code, and send out the help-seeking message through the second communication unit. The duration threshold corresponds to the target code.

The second processing unit is configured to obtain a presentation information code according to the human body presentation information in each preset height section. The second processing unit is further configured to record a duration in which the presentation information code is in a matching state with the target code when the presentation information code is in the matching state with the target code. The second processing unit is further configured to generate a help-seeking message when the duration is greater than a time threshold corresponding to the target code, and send out the help-seeking message through the second communication unit. The time threshold corresponds to the target code.

With the help-seeking method and system for indoor care according to the embodiments of the present disclosure, a presentation information code is obtained through the acquired human body presentation information in each preset height section, a duration in which the presentation information code is in a matching state with the target code is compared with the time threshold corresponding to the target code, and a help-seeking message is generated when the duration is greater than the corresponding time threshold. Accordingly, all possible behavioral postures of a human body in daily activities are converted into and represented by respective target codes, and the target codes are associated with time (both the normal and abnormal behavioral postures are allocated with a time limit for allowable duration) and then preset in the system. When there is only one person indoor, the duration in which the human body presentation information code is in a matching state with the corresponding target code is recorded, so a help-seeking message can be generated for an abnormal situation in which the duration of a behavioral posture is greater than the time threshold for the target code. In this way, external family members or caregivers can be informed to check and confirm in time to determine whether it is necessary to provide help, so as to realize the efficient use of the indoor unattended care and the external all-day attend/assistance, and effectively improve the safety insurance of the elder while living alone.

DETAILED DESCRIPTION OF THE EMBODIMENTS

In order to better understand the objects, technical solutions, and technical effects of the present disclosure, the present disclosure will be further described with reference to the accompanying drawings and embodiments. It is meanwhile stated that the embodiments described below are merely illustrative of the present disclosure and are not intended to limit the present disclosure.

Figure 1:
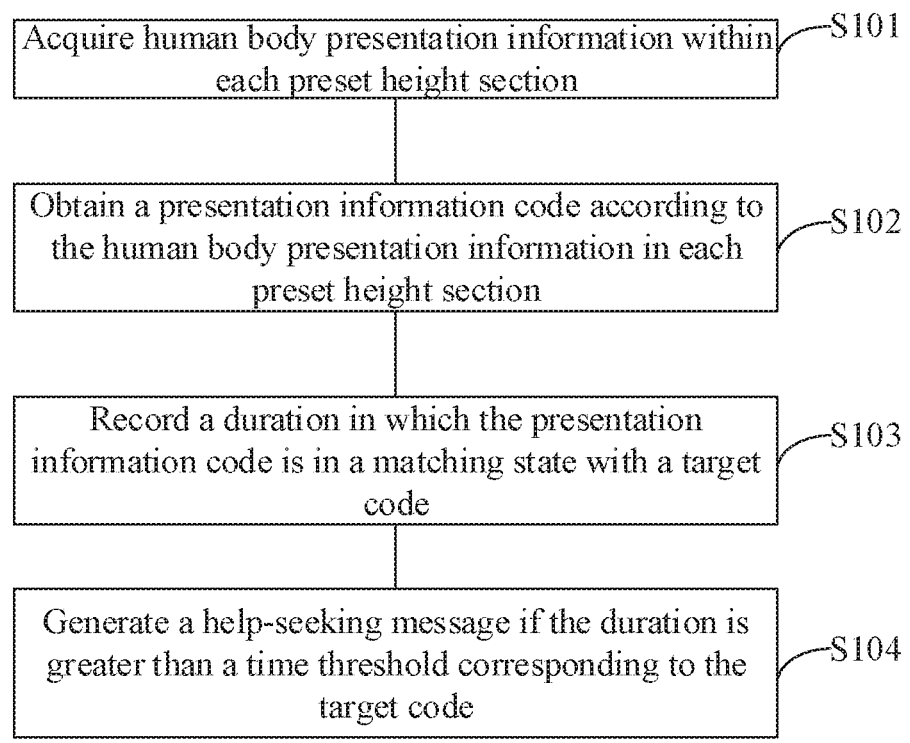
FIG. 1 is a flow diagram illustrating a help-seeking method for indoor care according to a first embodiment.

FIG. 1 is a flow diagram illustrating a help-seeking method for indoor care according to the first embodiment. The method includes following steps from S101 to S104.

At S101, human body presentation information in each preset height section is acquired.

The human body presentation information refers to human body shape intuitive information that can be detected by electromagnetic waves or non-intuitive information such as human body infrared radiation, Preferably, the human body presentation information is infrared radiation information of the human body, that is, human body activity information that can be detected by a passive infrared detecting technology, such as a curtain-type infrared probe, which is formed by a pyroelectric sensor in combination with an optical lens like a Fresnel lens.

The height in the term "preset height section" refers to a vertical height from the ground, and the preset height can be adjusted and changed within a range according to the specific height of the user. The following is an explanation of setting the height section by taking three preset height sections as an example. The three preset height sections include a first preset height section, a second preset height section, and a third preset height section. If the first preset height section is 130 cm to 150 cm, the second preset height section is 80 cm to 90 cm, and the third preset height section is 10 cm to 20 cm, then, for a care recipient who is 1.8 m or less in height, when in a standing posture or walking through within the detection range, the human body presentation information of the care recipient may be detected in the first preset height section, the second preset height section, and the third preset height section. When the indoor care recipient is in a sitting posture with both feet on the ground, such as sitting on a chair, a sofa or a toilet, the human body presentation information of the care recipient can be detected in the second preset height section and the third preset height section (that is, the movements of the upper body, leg and foot can be detected). When the indoor care recipient is sitting on a bed, a chair or a sofa with both feet off the ground, the human body presentation information can be detected only in the second preset height section. If the care recipient lies on the ground or sits on the ground with his head down, the human body presentation information of the care recipient can be detected only in the third preset height section. When the care recipient is outside of the effective detection range of the system or has left the current indoor care area, the human body presentation information of the care recipient cannot be detected in the first preset height section, the second preset height section, or the third preset height section (the human body presentation information for the three height sections will become a zero value). But in particular, when the system uses a passive infrared detection technology with a pyroelectric sensor to acquire human body presentation information, even if the care recipient is still in the care area (effective detection range), the human body presentation information obtained by the system in each preset height section will all become zero when the limb behavior changing from a noticeable motion to a stationary or un-noticeable motion (that is, the range of motion is lower than the detection capability of the infrared probe) for a period of time (for example, after a few seconds). Obviously, this does not mean that the care recipient has left the effective care area.

At S102, a presentation information code is obtained according to human body presentation information in each preset height section.

In an embodiment, when the human body presentation information appears in each preset height section, the presentation information code is obtained according to the human body presentation information. That is, when the human body presentation information appears in the preset height section, the human body presentation information is recorded, and combined with the recorded human body presentation information in each preset height section, to obtain the presentation information code.

In an embodiment, the human body presentation information in different height sections at the same address is represented by numbers or characters, and the character combination (code combination) arranged in the order of the height sections is the presentation information code. In an alternative example, the presentation information code is a binary digit string formed by binary values representing the human body presentation information in respective preset height sections, which are arranged in an order of respective preset heights.

Optionally, the process of obtaining the presentation information code at an address according to the human body presentation information in each preset height section, including the steps of: acquiring the address information; and arranging and combining the address information and the human body presentation information to obtain the presentation information code.

That is, the human body presentation information and the address information are combined, and the result presentation information code includes an address feature. Taking the aforementioned first preset height section, second preset height section and third preset height section as an example, the presentation information code is explained as below. The human body presentation information in the first preset height section is P1, the human body presentation information in the second preset height section is P2, and the human body presentation information in the third preset height section is P3. Optionally, for binary representation, if the human body presentation information is detected in the first preset height section, P1=1, and if no human body presentation information is detected, P1=0. Similarly, P2=1 or 0, P3=1 or 0. Then the human body presentation information at three heights are arranged in a preset height order: P1+P2+P3, and the following code results will appear corresponding to the human body behavior described in the example of above step S101. When the care recipient is standing or walking on the ground, P1+P2+P3=111; when the care recipient is sitting on a bed, a chair, a sofa or a toilet with both feet on the ground, P1+P2+P3=011; and when the care recipient lies on the ground, P1+P2+P3=001. If the address location information of each care area is represented by A, B, C or other letters (of course, it can also be directly represented by numbers) and placed in the first position of the presentation information code, when a person enters the area A where there is no person before, the presentation information code (character string) generated at the step S102 is (from A000 to) A111. If the care recipient enters the area C such as a bathroom, from the area A, a code C111 is first generated at the step S102, and a code A000 (away from area A) is then generated. When he sits on the toilet, a code C011 appears. If he sits on the toilet and accidentally falls to the ground, a code C001 will be generated at the step S102 and so on.

Optionally, the human body presentation information in each preset height section may be acquired in a non-continuous manner, that is, the human body presentation information in each preset height section may be acquired at time intervals, and the acquired human body presentation information is sequentially combined with the address location information to obtain the presentation information code at the current address.

At S103, a duration in which the presentation information code is in a matching state with the target code is recorded and compared with a time threshold corresponding to the target code.

The target code refers to a set of codes that are preset in the system and can be acquired by a matching method, and is completely the same as the external presentation information and mirror corresponds to the external presentation information one by one. All of the codes mirroring the external presentation information code one by one constitute a target code set. Each target code in the set can reflect a possible (normal or abnormal) behavioral posture of a human body somewhere indoors, and the entire target code set reflects a behavioral posture that a human body may have around the indoor. Therefore, by using a target code in the target code set, it is capable of knowing which kind of human body behavioral posture is reflected by a certain presentation information code matching it.

In an alternative example, according to a certain corresponding relationship between the distribution of the human body presentation information at the vertical height and the behavioral posture thereof, a code set may be built in the system in advance to reflect a code set of the corresponding human body behavioral posture by a distribution condition of the human body presentation information at the vertical height. If the preset code and the external presentation information code are encoded in a completely consistent encoding manner and correspond to the same preset height section, as described above, the preset codes can be used as target codes and mirror correspond to each external presentation code one by one. Each target code and its corresponding data value can be obtained from the target code set—a time limit for duration allowed by a certain human body behavioral posture, that is, a time threshold corresponding to the target code.

The details are described as follows.

Explanation I

A behavioral posture of sitting, lying, standing/walking and the like of a person indoors will present a body distribution at different heights in the vertical direction.

For an elder who is not physically disabled with limb disability, if he is not serious hunchbacks, his indoor daily life behaviors (excluding dangerous behaviors such as using an ordinary bathtub, squatting on toilet, rolling and jumping alone), the distribution of the body posture in the vertical direction has the following ranges that can be clearly corresponded.

1. A Posture for Activities Standing on the Ground or Walking

For example, an elder who is 1.5 m in height, even if the elder is slightly hunched, the height of the whole body when standing or walking will not be lower than 1.35 m, that is, the body posture is distributed in the height section from the ground to above 1.35 m.

2. A Behavioral Posture for Sitting on a Chair, a Sofa, a Bed or a Toilet

Because the height of a desk, a dining table or the like in the home environment is almost around 0.8 m, when an adult who is below 1.8 m in height sits in front of these desks and tables, the height of his head from the ground will be above 0.8 m, but the higher of the overall body will not be larger than 1.35 m, no matter when he is dining, chatting or reading, or even when he is bending over the desk. instead of being in front of a desk or a table, even if he is 1.4 m in height, the height of his head from the ground when sitting on a chair, a sofa or a toilet is not less than 0.8 m. It can be seen that the distribution of the body at the vertical height is the existence of human body information at least between 0.8 m and 1.35 m for sitting posture not on a bed. When an adult, who is less than 1.8 m in height, sits on a bed, his body is distributed at least between 0.5 m and 1.35 m in vertical height. In the above two types of sitting postures, it is impossible to determine whether the legs and feet are on the ground. Therefore, for those who are above 1.4 m in height, the posture distribution of various kinds of sitting postures can be clearly defined as the existence of human body information between 0.8 m and 1.35 m.

3. A Behavioral Posture for the Whole Body Lying on a Bed, a Chair or a Sofa

In the furniture environment of ordinary size, for an elder who is less than 1.8 m in height, the height of the body from the ground when the whole body lying flat on a bed, a chair or a sofa is not less than 0.5 m. Even if considering the posture of lying on the back with bent knees, the body posture of the elder lying on the bed is only distributed between about 0.5 m and 0.8 m from the ground.

4. When an elder presents a behavioral posture that the whole body thereof is on the ground, for example, for someone who is 1.8 m or less in height, no matter he is lying on the back with bent knees, struggling up, or crawling, the height of the body is difficult to reach 0.8 in, so the corresponding posture distribution is human body presentation information existing below the height of 0.8 in from the ground.

As for behavior actions such as bending over, kneeling, and even climbing, although they are dangerous and generally prohibitive for an elder to try, the posture also corresponds to a certain distribution relationship in the vertical height.

Explanation II

If the same encoding manner as the external presentation information code is used, corresponding to the same preset height section, all the codes reflecting various kinds of behavioral postures of a human body appearing around the indoor can be used as the target code (set) to be preset in the system. For a certain presentation information code from the external at a certain time, a target code mirroring the presentation information code may be registered from the target code set of the system by, for example, a data matching method. It is known through this target code that this presentation information code reflects a certain current possible behavioral posture of a human body here.

It can be seen from the aforementioned Explanation I that if a plurality of certain joint heights is reasonably selected to observe the human body posture distribution presenting at different heights, a certain current possible behavioral posture can be determined by the human body presentation information at a plurality of heights at a location reversely. Thus, if the same encoding manner as described in the step S102 is adopted, the human body presentation information for the same three heights is represented by P1, P2 and P3, and represented in binary form that 1 means there is human body presentation information and 0 means there is no human body presentation information, and the address position is also represented by A, B, C, . . . , N, etc., then the codes arranged in the form of N+P1+P2+P3=NP1P2P3 can correspondingly reflect a corresponding possible human behavioral posture of a person at the address N illustrated in the step S102. Still using the three preset height sections in the step S101 (for someone who is 1.8 m or less in height), if the address represented by A is a bedroom, the code A110 reflects that a current behavioral posture of a human body may be ascending in a bedroom ladder, or it may be an activity in which the whole body is on a chair, a sofa or a bed. If the code is A010, it reflects a posture of a human body sitting on a bed, a chair, or a sofa with both feet off the ground. If the code is A011, it should be a posture for sitting on a bed, a chair, or a sofa with both feet on the ground or bending over while standing on the ground. If C represents a bathroom, the code C011 indicates that the human body may sit on a toilet, or may stand on the ground and bend over. If the code is N001, it certainly reflects a posture of a human body falling on the ground at the position N or bowing and squatting at the position N. If the code is N100, it indicates that someone climbing up or descending from a high place at the position N. As for the code 101, it is impossible to have a human body's behavior corresponding to it.

In this way, a human body presentation information distribution formed by human body information presented at a plurality of levels of height at an address can be represented by numbers or characters level by level to form a character string as a target code to reflect a certain current possible behavioral posture of a person. Of course, the accuracy is related to the selected height of each level and the selected number of levels.

Explanation III

Since the target code and the presentation information code are both character strings with the same arrangement format, a target code, which is exactly the same as and mirroring a certain presentation information code, can be registered from the target code set by using methods such as data matching. Therefore, the duration in which the recorded presentation information code is in a matching state with the target code described in the step S103 is equal to the duration of recording the target code (appearance) matching it, that is, recording the duration of a certain behavioral posture corresponding to the target code.

In daily life, there should be an allowable limit for the duration of various kinds of human body behavioral postures on different occasions, including abnormalities such as difficulty in movement (of course, the sleeping behavior in bedroom will have different time limits for day and night), so a time value, i.e. limit of time length, can be determined for each target code that reflects a human body behavioral posture, and the a corresponding time threshold is given to the target code. For example, in the bedroom B, an elder generally gets up within 10 or 12 hours after lying down (sleeping) at night. If a behavioral posture for getting up or getting out of bed (standing or walking) does not appear after 10 or 12 hours, then the external personnel need to pay attention, observe and inquire. If three preset heights are set for detection in the bedroom B, the same encoding manner as at S102 is used. For a user who is below 1.7 m in height, among the presentation information codes obtained from detection of human body presentation information at three preset heights of 1.3 m, 0.6 m, and 0.2 m, only a behavioral posture corresponding to the code B010 can be sitting or lying on a bed, a chair or a sofa with both feet off the ground, so the time threshold corresponding to the target code B010$m$ (the code with a suffix letter in is the target code, the same below) that matches B010 is 10 or 12 hours at night (the time threshold can be automatically change to for example, 2 hours by using the clock function during the day). Of course, if four preset heights of 1.3 m, 0.9 m, 0.6 m, and 0.2 m are set for detection, it can be further distinguished between sitting with both feet off the ground and lying flat. The time threshold of the target code B0110$m$ corresponding to the posture of sitting on a bed or a couch sofa with both feet off the ground can be allowed to be, for example, 3 hours, The time threshold of the target code B0010$m$ corresponding to the posture of the body lying flat with both feet off the ground is also 10 hours (night) or 2 hours (day). For another example, when detecting from three preset heights of 1.3 m, 0.8 m, and 0.2 m and the physical activity information of an elder who is less than 1.7 m in height appears only at a height of 0.8 m above the ground, if the duration exceeds for example, 1 minute, it should be checked as soon as possible whether the elder is in a falling posture or a dangerous posture of squatting/sitting on the ground. The allowable duration time limit of the human body behavioral posture corresponding to this height can be set as 1 minute, and the time threshold given to the target code like C001$m$ corresponding to this posture is 1 minute. Similarly, the corresponding time thresholds of target codes A001$m$, B001$m$, N001$m$, etc. in the set are 1 minute.

Using the time thresholds corresponding to these target codes as references, and comparing with the duration of a corresponding behavioral posture of a current human body, it can be found out whether the current human body activity behavior is in an abnormal or dangerous state because it exceeds the allowable duration.

Take the human body presentation information code obtained in the first preset height section, the second preset height section, and the third preset height section in the aforementioned step S102 as an example to explain and describe the execution steps of S103 (refer to FIG. 3):

If the code C011 is generated at step S102, the target code C011$m$ mirroring C011 will be first found out from the target code set, and then the duration TC011 of C011 will be record at the step S103. At the same time, TC011 is compared with time threshold TC011$m$ given by the target code C011$m$. If the time threshold of the target code C011$m$ is TC011$m$=30 minutes and the executing result of S103 depends on whether TC011 exceeds 30 minutes, that is, whether TC011/TC011$m$>1 finally appears, then it proceeds to S104 as long as TC011/TC011$m$>1 appears.

At S104, a help-seeking message is generated if the duration is greater than a time threshold corresponding to the target code.

In an alternative example, if the time TC011 is greater than the time threshold TC011$m$ corresponding to the target code C011$m$, that is, when TC011/TC011$m$>1 appears, a help-seeking message is generated and sent out at S104.

It can be seen that if the obtained human body presentation information of each preset height is continuous real-time information, as described in the methods of the aforementioned steps S101 to S103, a target code with a pre-given time threshold value can be used as a reference for determining whether there is an indoor abnormal human body behavior, and send out a help-seeking message about the abnormal behavior state to inform external family members or caregivers, who can check and confirm in time through the audio/video device disposed indoors after receiving the help-seeking message to determine whether they need to enter the scene for assistance while maintaining the privacy of the elder to the greatest extent (because the system will only allow the audio/video device disposed indoors to access the external network for a limited time, such as 10 minutes after sending out the help-seeking message and then disconnect with the external network). In an alternative example, when there is no pet such as a cat or a dog indoors, methods such as infrared thermal imaging scanning technology/image recognition technology, or laser (radar) scanning imaging technology can be directly used to achieve effective use.

However, if a passive infrared probe formed by a pyroelectric sensor is used to acquire human body presentation information, only discrete human body presentation information can be obtained under the current general technical conditions. This is because currently such passive infrared probes can only detect human body activities reaching a certain level. When the human body activity changes from noticeable to stationary or un-noticeable, it may result in that human body presentation information obtained thereafter is zero. in this way, even if the care recipient does not leave and stay at the same (care area) address, the behavior at the same height changes from noticeable activity to un-noticeable activity or no activity. For example, stopping and standing while walking, resting with eyes closed after sitting, and going to sleep after lying down, etc., will all cause the human body presentation information to change from non-zero to all zero, that is, the presentation information code, such as N111, will change to N000 instead of continuing to be N111. A passive infrared detection system which has such a characteristic that the obtained human body presentation information will change from non-zero to all zero while the human body behavioral posture is unchanged. Obviously, the method according to the aforementioned steps S101 to S103 cannot be directly used to obtain correct conclusions when continuous detecting information corresponding to a persistent behavioral posture may not be provided.

In an alternative example, the presentation information code formed by non-all-zero human body presentation information may be used as a first code of presentation information, while the presentation information code formed by all-zero human body presentation information may be used as a second code of presentation information.

The process of recording the duration in which the presentation information code is in the matching state with the target code includes the steps of: continuing to be record the duration in which the presentation information code is in the matching state with the second target code if the presentation information code changes from the state of matching the first target code to the state of matching the second target code, the target code also including a first code and a second code, and the time threshold corresponding to the second target code also corresponding to the first code.

The time threshold corresponding to the second target code matches the first code, that is, the time threshold corresponding to the second target code is specifically associated with the first code. After the presentation information changing from the first code to the second code, the time threshold corresponding to the second target code needs to be determined through the first code. Taking the first code of presentation information as A or B, and the second code (all-zero code) as C, with corresponding target codes Am, Bm, and Cm, as an example, after the presentation information code changes from A to C, or changes from B to C, the duration of the second code C is recorded while matching to obtain the target code Cm. Prior to using the time threshold corresponding to Cm for comparison, the time threshold of Cm is determined according to whether the first code appearing before is A or B. This is because the all-zero code C of the human body presentation information may appear after the non-zero code A or the non-zero code B. Therefore, there may be more than one time threshold corresponding to the same target code Cm, and the first code A and B may have different values.

In an embodiment, the human body presentation information is only acquired from two preset height sections at the step S101, the presentation information is arranged in the same encoding manner as at S102, and then the code formed by non-all-zero human body presentation information is used as the first code of the presentation information. The code formed by all-zero human body presentation information is used as the second code of the presentation information. When the phenomenon that the presentation information code is changed from the first code to the second code appears in S103, the time for which the presentation information code continues to be the second code is continuously recorded, and the corresponding time threshold is selected from the current matching target code according to the previous first code. The target code preset in the system can also be used as a reference to determine whether a human body behavior reflected by the presentation information code obtained by the passive infrared probe may be in an abnormal or dangerous state. Of course, it is the simplest solution to acquire presentation information of human body activities from only two preset heights.

The details are described as follows.

Figure 2:
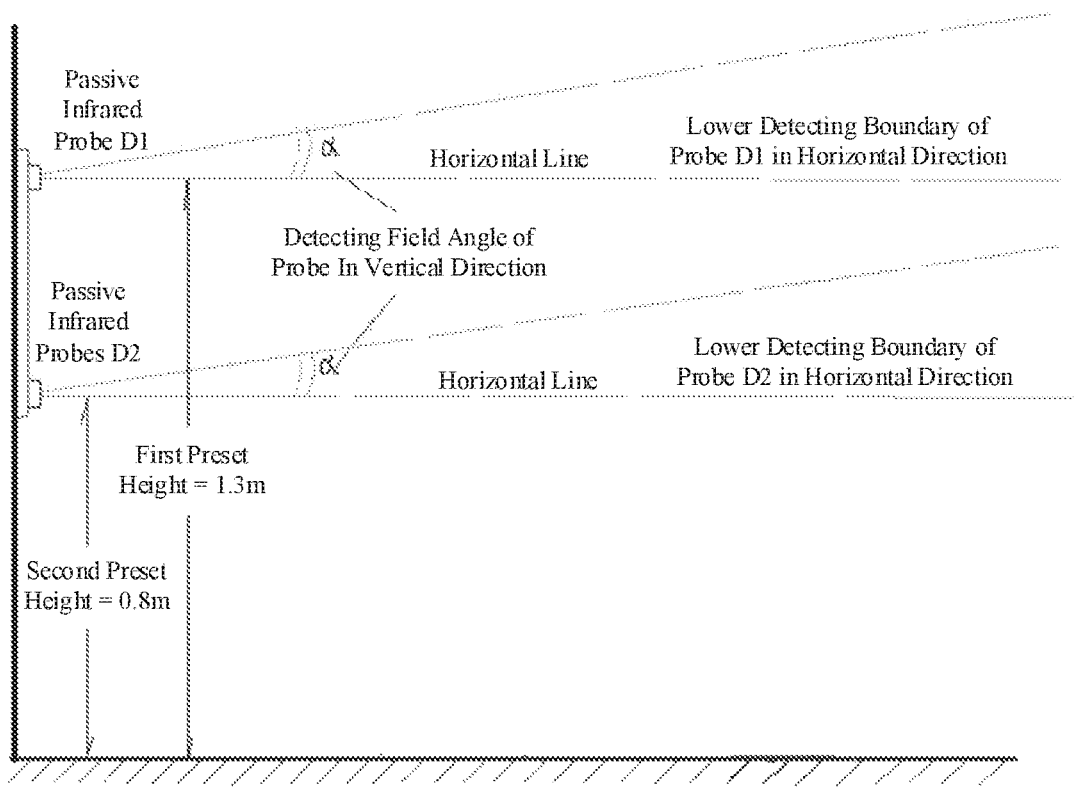
FIG. 2 is a schematic diagram illustrating a help-seeking method for indoor care according to a specific application example.

FIG. 2 is a schematic diagram illustrating the help-seeking method for indoor care according to a specific application example (for a user who is 1.4 m to 1.7 m in height). As shown in FIG. 2, a simple solution is illustrated. At the step S101, only two preset heights of 1.3 m and 0.8 m is used to acquire human body presentation information for an address, and the detection areas of the passive infrared probes D1 and D2 disposed at two heights of 1.3 in and 0.8 in are a flat fan space having a field angle $\alpha$ as small as possible in a vertical direction, for example, within 30°, and having a wide angle in the horizontal direction, for example, 100° or more (preferably using a curtain-type infrared probe). Lower boundaries of the detection areas of the two probes in the vertical direction do not overlap each other in the horizontal direction of the entire front sector surface as shown in FIG. 2, thereby ensuring that detection of the presentation information of human body activity in the front sector surface at two heights does not cross and overlap. Because the human body presentation information obtained from the third preset height (below 0.3 m from the ground) is not used, the format of each presentation information code is reduced by one bit, which becomes N+P1+P2=NP1P2 as described above. Of course, this means that the human body presentation information obtained by the slightly pitching-up passive infrared probes arranged in such two heights cannot be directly used to draw a conclusion whether the human body activity and behavior has for example, fallen to the ground.

At step S102, the presentation information code is generated by the human body presentation information obtained corresponding to two preset heights in S101 in combination with the address information by using the same encoding manner. Similarly, the target code set is formed by the mirroring codes of all the presentation information codes in advance. However, for the presentation information code (the second code) of the all-zero human body presentation information, the presentation information disappears and becomes zero not because the human body leaves the current address, but because the body's limbs above 0.8 m height stop detectable activities, or physical activity is completely undetected under 0.8 m. Because the human body behavioral postures at these two completely different heights correspond to the all-zero human body presentation information code at this time, although the matching target code is the same all-zero code, this all-zero target code will have a plurality of different time thresholds which are respectively represented by TN00$m$1, TN00$m$2, and TN00$m$N (the number N of time thresholds is determined by the number of preset heights for detecting the human body presentation information). After proceeding to S103 in this way, when the presentation information code is changed from the first code to the second code, the corresponding target (second) code is to be matched first, and the duration of the second code of this presentation information continues to be recorded and a corresponding time threshold is selected from the current matching target (second) code according to the previous presentation information for comparison. Taking the aforementioned example for illustration, there is also a change in the presentation information code from the first code to the second code in bedroom W, that is, from a non-zero presentation information code, such as W11 or W01 to an all-zero presentation information code W00. When facing the same presentation information code W00 and determining which time threshold from the matching target code W00*m* is selected for comparison, it is necessary to consider the posture of the previous behavior, that is, it is necessary to refer to whether the presentation information code before W00 is W10, W01 or W11. Only then can whether the time threshold of the current corresponding target code should be TW00*m*1 or TW00*m*2 or TW00*m*N be determined.

In an embodiment, it is based on the same inventive concept. For example, for a user who is between 1.4 m and 1.7 m in height, human body activity information is still detected from two preset heights of 1.3 m and 0.8 m. Corresponding to the activity behavior after entering the bedroom W, at S103, the presentation information code W11 reflecting a walking posture is obtained first and W00 will appear after W11 if stop walking. For example, when stopping and standing in front of a window, if daily behaviors such as looking out at the view, moving the human body or using the phone will not last for 3 minutes in still, the time threshold of target code W00*m* can be set as TW00*m*1=3 minutes, that is, if a new non-zero human body presentation code does not appear in 3 minutes after a standing/walking posture stops or disappeared, the system should inform external personnel to see if there is any abnormality (from S103 to S104 to send information outward). If an elder changes from standing to sitting on a bed, a chair or a sofa, the presentation information code W01 will appear after W11. If the presentation information code W00 appears thereafter and lasts for more than 10 minutes, it may be that the elder is sitting and resting with eyes closed, or may also be going to sleep after going to bed, then select the time threshold TW00*m*2 corresponding to the target code W00*m* at this time according to code W01, which can be set accordingly as 2 hours during the day and 10 hours at night by clock function. When an elder gets up at night and falls accidentally during walking in the bedroom, the code W00 appears, because the code W00 is also appears after W11, the time threshold of the corresponding target code W00*m* is TW00*m*1=3 minutes, which is the same as the aforementioned stopping (standing) during walking, that is, it the human body presentation information code W01/W11 of sitting up or walking has not appeared 3 minutes after the fall, S103 will proceed to S104 to send out a help-seeking message regardless of whether the limb activity is noticeable within 3 minutes after the fall. If the human body presentation information code W10 appears in bedroom W, because it reflects the dangerous behavior attitude of moving (ascending or climbing) above 1.3 m above the ground, the time threshold of the corresponding target code W10*m* can be limited to TW10*m*=2 minute. If within two minutes, the human body presentation information code changes from W10 to W00, which due to the stop or disappearance of human body activity at a high place. For this time, the time threshold TW00*m*3 under target code W00*m* should be smaller, for example, set as TW00*m*3=30 seconds, so that in case of an accident of falling from a high place, it can be reported outward through S104 in time. And if the code W10 continues to appear for more than 2 minutes without changing from code W10 to code W11 or code W01, then TW10/TW10*m*>1 will appear in S103 because TW10*m*=2 minutes, and the external personnel will be informed through step S104 to check why the dangerous activities in the current bedroom last for a long time.

The following example illustrates the operation of S103 in other scenarios (the aforementioned simplest solution is still used, and for a user who is 1.4 m and 1.7 m in height, human body activity information from two preset heights of 0.8 m and 1.3 m from the ground is detected).

After entering a living room A, an elder sits on a chair or a sofa and slowly closes his eyes to rest. Because A00 appears after A11 to A01, A01 before A00 will be used as a reference in S103, and the time threshold TA00*m*1 of the corresponding target code A00*m* will be selected to compare with the duration TA00 of A00. If the maximum rest time (threshold TA00*m*1) after sitting in living room A is 2 hours (because there is no long-term sleep behavior at this address), when a result of TA00/TA00*m*1>1 appears, it proceed to S104 to send out a message, and asks external personnel to check through audio/video device why the elder cannot get up after 2 hours. And if during the period of TA00/TA00*m*1<1 (that is, within 2 hours), an elder gets up but feels dizzy, and sits still or even falls down, for example, there is almost no noticeable movement for more than 3 minutes, then another time threshold TA00*m*2 will be selected according to A11 to compare with the duration of A00 because code A00 appears directly after code A11 in S103. If it can only allow TA00*m*2=3 minutes, when TA00/TA00*m*2>1 appears, that is, after 3 minutes, S103 will proceed to S104 to generate a help-seeking message and send out a call for help.

For another example, after an elder enters toilet C, the presentation information code of C11 first appears in S103, and then when sitting on a toilet, the presentation information codes of C01, C00, C01, C00, etc. will continue to appear in S103. That is, the elder will have intermittent physical activity at a height of about 0.8 m after sitting down on the toilet. Although code C00 appears after code C01 because he is sometimes stationary, the time threshold TC00*m*1 of target code C00*m* that matches the current C00 according to the previous code C01 will be selected to be compared in S103. If the threshold of TC00*m*1 is allowed to be for example, 99 seconds, as long as the sitting position of the elder does not remain stationary during 99 seconds so that TC00/TC00*m*1>1 appears in S103, then it will not proceed to S103 to S104, but will be reproduced after the code C01, the duration of the reappearing code C00 is re-recorded and compared with TC00*m*1 at the same time. However, if at any time during an elder's fall to the ground uncomfortably because of an heart attack, no matter he is immobile or struggling, in short 99 seconds there is no human body presentation information code C01 reflecting the sitting posture or information code C11 reflecting the standing posture, S103 will proceed to S104 after TC00/TC00*m*1>1 (that is, after 99 seconds), to generate a help-seeking message and send out a call for help.

Similarly, in the bathroom C, if an elder accidentally slips and falls during bathing, which causes the presentation information code of C00 to appear in S103, because it is directly changed from the code C11 to the code C00, the time threshold TC00*m*2 under target code C00*m* will be selected for the current code C00 according to the code C11 for the comparison of threshold in S103. If the allowable time threshold of appearing code C00 includes staying still after standing in the bathroom is TC00*m*2=1 minute, then S103 will proceed to S104 after TC00/TC00*m*2>1 (that is, 1 minute) to generate a help-seeking message and send out a call for help. Finally, it should be noted that, as a better example, as long as the effective detection range of each detecting pile is guaranteed to be connected and covered with each other in every space indoors, although the elder leaving toilet C will also cause his human body presentation information code to change from C11 to C00, it does not take more than 1 minute to enter other places such as the address A or B (more than 1 minute will also cause to proceed to S104 from S103 because TC00$m$2=1 minute, so as to report that the elder may be have difficulty in movement and need assistance). In S102, the human body presentation information code such as A11 or B11 will appear, and S102 will then transfer to A11 or B11 matching the corresponding target code A11$m$ or B11$m$. The continuous recording of TC00 is stopped executing at S103, and TA11 or TB11 is continuously recorded and compared with the corresponding time threshold TA11$m$ or TB11$m$. Therefore, the continuous operation of steps from S101 to S103 is actually a continuous tracking and analysis of the activity and behavior of one person indoors.

It can be seen from the above that when the human body presentation information is obtained. from each preset height of more than 0.8 m at S101, for example, for a user who is between 1.4 m and 1.7 m in height, the human body presentation information obtained at two heights of 1.3 m and 0.8 m. After the presentation information code is obtained in combination with the address information, the code formed by non-zero human body presentation information is used as the first code of the presentation information, and the all-zero presentation information code of the human body presentation information is used as the second code. If the target code is also classified into a first code and a second code, when the presentation information code is changed from the first code to the second code, the duration of the second code of presentation information is continuously recorded, and the corresponding time threshold is selected for comparison from the currently matched target codes according to the previous first code. In this way, the indoor activity behavior of the elder alone can be attended to in various aspects by using the passive infrared detection technology formed by a pyroelectric sensor and also adopting the steps S101 to S104, so as to send out help-seeking/prompt information quickly and effectively for not only falling down, but also more suspected dangerous or abnormal behavior state. Family members or external caregivers will be contacted as soon as possible to check and confirm using an audio/video device already disposed indoors, through the network, and assistance is offered in time. And disturbance caused by the activities of pets in normal sizes on the ground can be avoided (because only human body infrared radiation at a plurality of heights above 0.8 m is detected), and the personal privacy of the elder can be maintained to the greatest extent (because the system will only allow the audio/video device disposed indoors to access the external network for a limited time, such as 10 minutes after sending out the help-seeking message, and then disconnected from the external network).

In an alternative example, after the passive infrared probe in the non-curtain shape detection range is modified by, for example, shielding a part of the probe lens area or adding some structural limitation to reduce the detecting field angle α of the probe, the operation shown in FIG. 2 can also be implemented to a certain extent.

Figure 3:
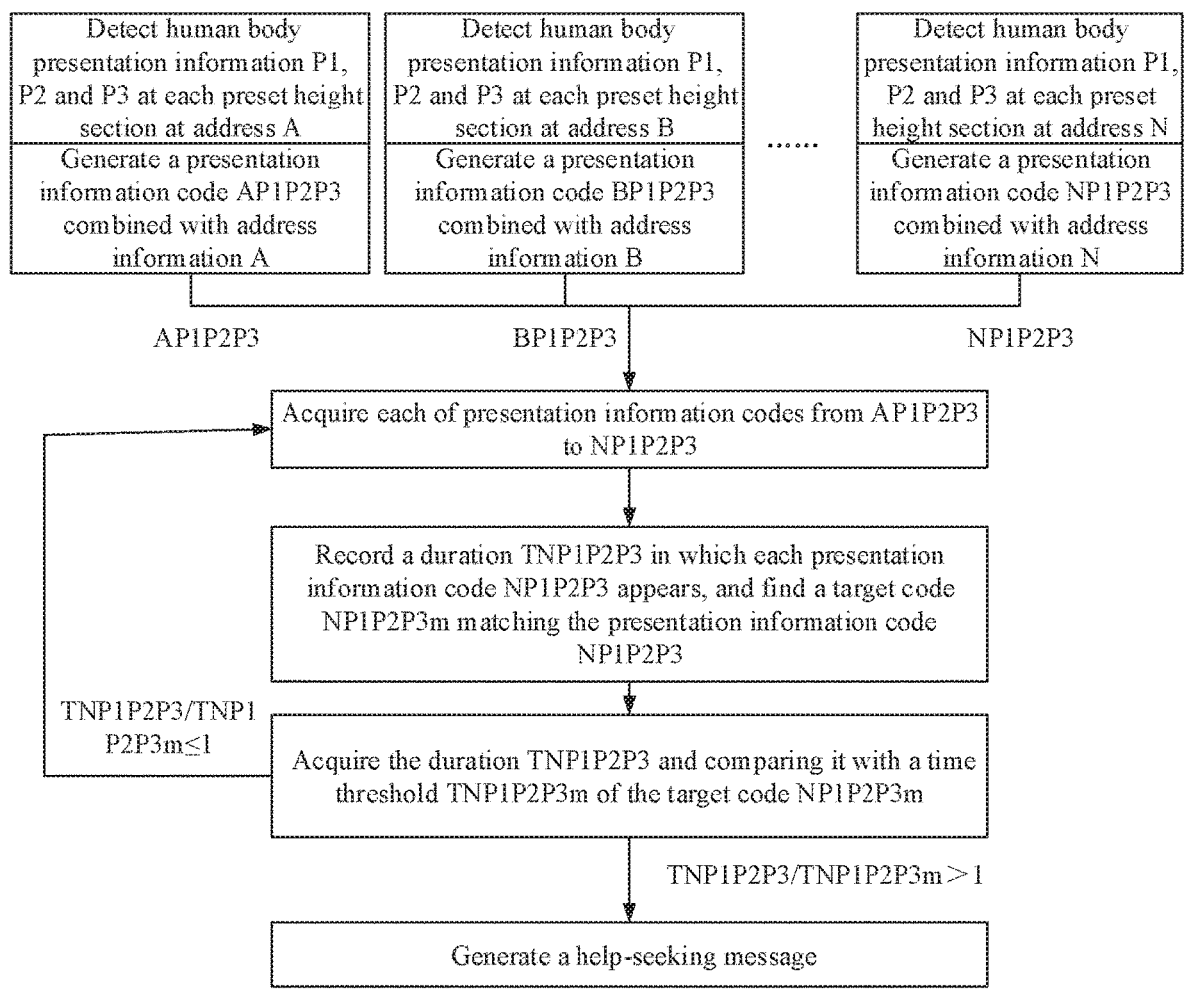
FIG. 3 is a schematic diagram illustrating a help-seeking method for indoor care according to another specific application example.

FIG. 3 is a schematic diagram illustrating a help-seeking method for indoor care according to another specific application example. As shown in FIG. 3, the aforementioned example is described in combination with the address information. In the help-seeking method for indoor care according to the first embodiment, the presentation information code NP1P2P3 can be acquired at the address N by combining the address information N, and the duration TNP1P2P3 of the presentation information code NP1P2P3 is recorded. Then, the target code NP1P2P3$m$ mirroring the presentation information code NP1P2P3 is found out from the target code set, and the duration TNP1P2P3 of the presentation information code NP1P2P3 is compared with the time threshold TNP1P2P3$m$ corresponding to the target code NP1P2P3$m$. If TNP IP2P3/TNP1P2P3$m$ is greater than 1, a help-seeking message is generated.

The help-seeking message can be sent in a variety of encoded files, such as a frame of image, prompt voice, help-seeking text message or text mail, through a network device, including a router, a camera, and the like, disposed indoors. The help-seeking message may be sent out through a wired or wireless network, that is, the help-seeking message is sent to an external information receiving device carried by a family member or a full-time caregiver of the care recipient, or community service agency staffs.

Optionally, the help-seeking message corresponds to the target code. That is, if the duration of a certain behavioral posture exceeds the time threshold of its corresponding target code, it represents that the current human body behavior may be in an abnormal or dangerous state. If the help-seeking message is an e-mail, the content of the e-mail may include prompt voices or image pictures in addition to a text calling for help. The sent help-seeking message allows external personnel to use the video/audio device disposed indoors to observe, inquire and identify about to various indoor dangerous/abnormal behaviors through the network in time, so as to determine whether it is necessary to enter indoors for assistance, thereby effectively improving the safety insurance of the elder while living alone.

With the help-seeking method for indoor care according to the first embodiment, a presentation information code is obtained through the acquired human body presentation information in each preset height section, a duration in which the presentation information code is in a matching state with the target code is recorded and compared with the time threshold corresponding to the target code, and a help-seeking message is generated when the duration is greater than the time threshold corresponding to the target code. Accordingly, all possible behavioral postures of a human body in daily activities are converted into and represented by respective target codes, and the target codes are associated with time (with a set reasonable time threshold), the allowable duration (threshold value) for various kinds of behavioral postures of the human body in daily activities can be used as a reference to compare with the duration of the individual's indoor activity behaviors. When there is a variety of abnormal behavior states with durations greater than the time threshold, the help-seeking message is sent out to inform external personnel to check and confirm (via video or audio device in time to determine whether assistance is needed, so as to achieve efficient use of indoor unattended care and the external all-day attend/assistance, and effectively improve the safety insurance of the elder while living alone.

Figure 4:
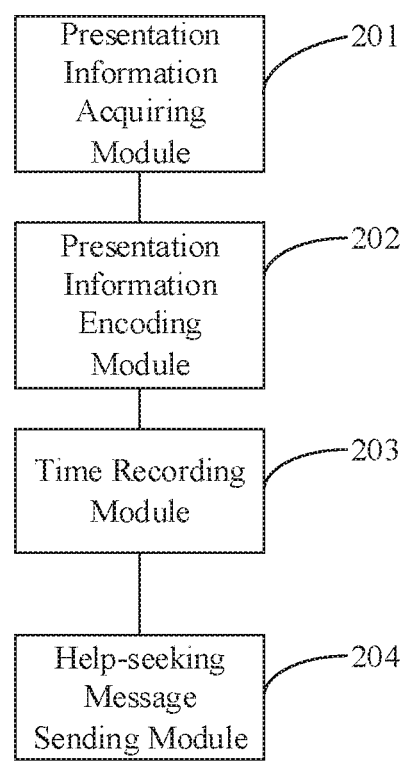
FIG. 4 is a block diagram illustrating a help-seeking device for indoor care according to a second embodiment.

FIG. 4 is a block diagram illustrating a help-seeking device for indoor care according to the second embodiment. As shown in FIG. 4, the help-seeking device for indoor care according to the second embodiment includes a presentation information acquiring module 201, a presentation information encoding module 202, a time recording module 203 and a help-seeking message sending module 204.

The presentation information acquiring module 201 is configured to acquire human body presentation information in each preset height section. The presentation information encoding module 202 is configured to obtain a presentation information code according to the human body presentation information in each preset height section combining with the address information. The time recording module 203 is configured to record a duration in which the presentation information code is in a matching state with a target code. The help-seeking message sending module 204 is configured to generate a help-seeking message when the duration is greater than a time threshold corresponding to the target code.

With the help-seeking device for indoor care according to the second embodiment, a presentation information code is obtained by the acquired human body presentation information in each preset height section, a duration in which the presentation information code is in a matching state with the target code is recorded and compared with the time threshold value corresponding to the target code, and a help-seeking message is generated when the duration is greater than the time threshold. Accordingly, all possible behavioral postures of a human body in daily activities are converted into and represented by respective target codes, and the target codes are associated with time (with a set reasonable time threshold), the allowable maximum duration (threshold value) for various kinds of behavioral postures of the human body in daily activities can be used to compare with the duration of the individual's indoor activity behaviors. When there is a variety of dangerous/abnormal behavioral postures with duration greater than the time threshold appears, the help-seeking message is sent out to inform external personnel to check and confirm (via video or audio device) in time to determine whether assistance is needed. In this way, the efficient use of indoor unattended care and the external all-day attend/assistance can be achieved, which effectively improves the safety insurance of the elder while living alone.

A computer device is provided in an embodiment of the present disclosure. The computer device includes a memory, a processor and a computer program stored on the memory. The computer program is executable by the processor, and when executed, causes the processor to implement the steps of the help-seeking method for indoor care according to any one of the aforementioned embodiments.

With the computer device according to this embodiment, a presentation information code is obtained by the acquired human body presentation information in each preset height section, a duration in which the presentation information code is in a matching state with the target code is recorded and compared with the time threshold corresponding to the target code, and a help-seeking message is generated when the duration is greater than the time threshold. Accordingly, all possible behavioral postures of a human body in daily activities are converted into and represented by target codes, and the target codes are associated with time (with a set reasonable time threshold), the allowable maximum duration (threshold value) for various kinds of behavioral postures of the human body in daily activities can be used to compare with the duration of the individual's indoor activity behaviors. When there is an abnormal behavior state with duration greater than the time threshold, the help-seeking message is sent out to inform external personnel to check and confirm (via video or audio device) time through external network to determine whether assistance is needed. In this way, the efficient use of indoor unattended care and the external all-day attend/assistance can be achieved, which effectively improves the safety insurance of the elder while living alone.

A computer-readable storage medium is provided in an embodiment of the present disclosure. A computer program is stored in the computer-readable storage medium. Steps of the help-seeking method for indoor care according to any one of the aforementioned embodiments are implemented when a processor executes the computer program. In addition, the program stored in a storage medium is generally executed by directly reading the program out of the storage medium or by installing or copying the program to a storage device (such as a hard disk and or a memory) of a data processing device. Therefore, such a storage medium also constitutes the present disclosure. The storage media can use any type of recording means, such as a paper storage media (such as a paper tape, etc.), a magnetic storage media (such as a floppy disk, a hard disk, a flash memory, etc.), an optical storage media (such as a CD-ROM, etc.), a magneto-optical recording media (Such as a MO, etc.) and so on.

With the computer-readable storage medium provided in this embodiment of the present disclosure, a presentation information code is obtained by the acquired human body presentation information in each preset height section, a duration in which the presentation information code is in a matching state with the target code is recorded and compared with the time threshold corresponding to the target code, and a help-seeking message is generated when the duration is greater than the time threshold. Accordingly, all possible behavioral postures of a human body in daily activities are converted into and represented by target codes, and the target codes are associated with time (with a set reasonable time threshold), the allowable maximum duration (threshold value) for various kinds of behavioral postures of the human body in daily activities can be used to compare with the duration of the individual's current indoor activity behaviors. When there is a variety of dangerous/abnormal states with durations greater than the time thresholds, the help-seeking message is sent out to inform external personnel to check and confirm (via video or audio device) in time to determine whether assistance is needed. In this way, the efficient use of indoor unattended care and the external all-day attend/assistance can be achieved, which effectively improves the safety insurance of the elder while living alone.

Figure 5:
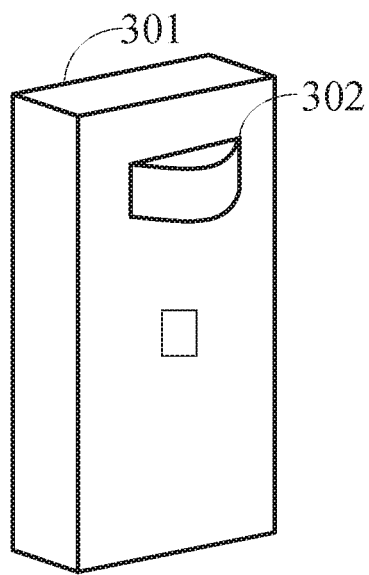
FIG. 5 is a schematic structural diagram illustrating a detecting pile according to a third embodiment.

FIG. 5 is a schematic structural diagram illustrating a detecting pile according to the third embodiment. As shown in FIG. 5, the detecting pile includes a detecting pile support 301 and one or more detecting units 302 disposed on the detecting pile support. Each detecting unit 302 is configured to detect human body presentation information in a respective preset height section.

Optionally, the detecting unit 302 is a curtain-type probe, and the curtain-type probe includes a light condensing window made up of an annular focal pointing support and a Fresnel lens fastened along an annular surface of the support. A sensor configured to detect infrared radiation from the human body is disposed at a focal point of the annular focal pointing support.

Figure 6:
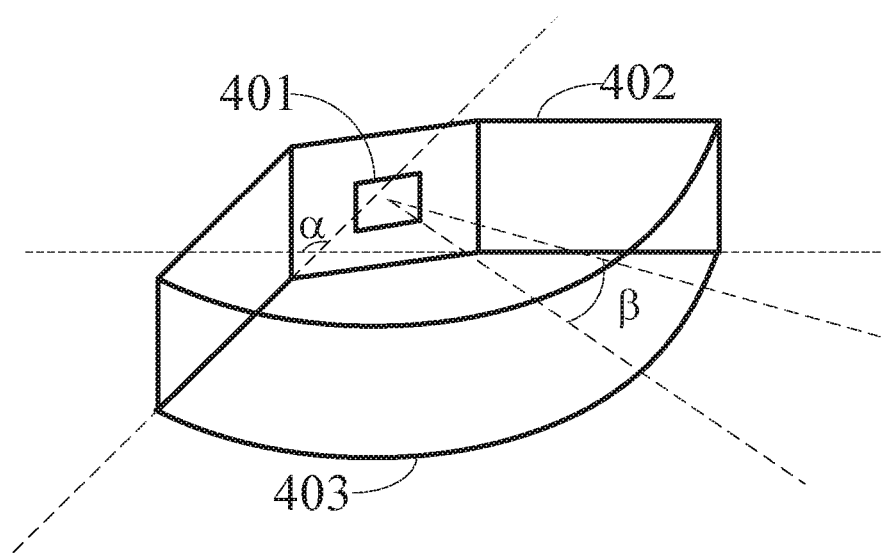
FIG. 6 is a schematic diagram illustrating a configuration and operating principle of a curtain-type probe.

FIG. 6 is a schematic diagram illustrating a configuration and operating principle of a curtain-type probe. As shown in FIG. 6, a light condensing window made up of an annular focal pointing support 402 and a Fresnel lens 403, and a pyroelectric sensor (PIR) 401 are fastened at a focal point of the focal pointing support 402. PIR is an acronym of Passive InfraRed.

Specifically, as shown in FIG. 6, the curtain-type probe used in this embodiment may be a curtain-type probe made of a "single-zone multi-segment horizontal" Fresnel lens its pyroelectric sensor 401 is fastened at the focal point of the annular focal pointing support 402. The annular focal pointing support 402 and the lens 403 form a light condensing window extending along a section of a circle. If a wide-angle pyroelectric sensor PIR is used as the sensor 401, the curtain-type probe has a horizontal detection angle of $\alpha \geq 100°$ and a vertical detection angle of $\beta \leq 15°$ in front, so that the curtain-type probe can have a detection capability for a relatively flat sector-shaped space in front. If a plurality of such curtain-type probes are arranged in a way that the light condensing window are horizontally disposed and faces indoors, and the curtain-type probes are fastened at intervals in a vertical direction according to preset height sections, and kept to have an elevation angle of about $\beta/2$. These probes can detect the physical activity of a same person at a same location at different heights in different levels within the detection range without overlap and duplication, so as to obtain human body presentation information corresponding to each preset height section.

If there is a location to arrange such detecting piles in a vertical direction to make these detecting piles have a relatively wide field of view, each of the detecting piles can perform layered detection at different heights for the human body presentation information in a sector-shaped indoor range of about 100° on a horizontal plane in front.

Figure 7:
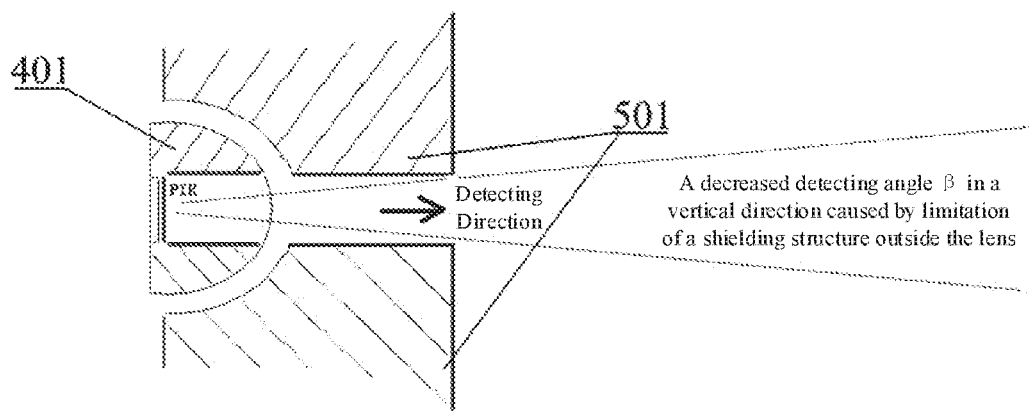
FIG. 7 is a schematic diagram illustrating a configuration and operating principle of a detecting unit according to an alternative example.

Optionally, FIG. 7 is a schematic diagram illustrating a configuration and operating principle of a detecting unit according to an alternative example. As shown in FIG. 7, the detecting unit 302 includes a non-curtain-type probe 401 and an external shielding structure 501. The shielding structure 501 is disposed outside the probe 401 and is configured to limit a vertical field angle of the probe 401 to the front.

Specifically, as shown in FIG. 7, the shielding structure 501 is used to limit the vertical field angle the probe 401 for the front detection area by the means of shielding part of a light path, so that the probe has a relatively flat detection capability. If the shielding structure is horizontally disposed and faces indoors, and then a plurality of probes are fastened at intervals in the vertical direction, these probes can detect the physical activity of the same person at the same location at different heights in different levels within the detection range and detect human body presentation information in respective preset height sections.

Figure 8:
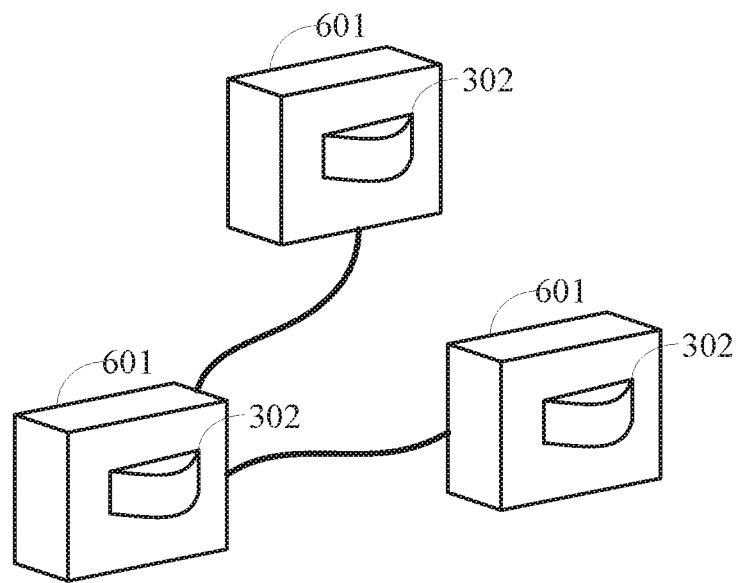
FIG. 8 is a schematic structural diagram illustrating a split-type detecting pile support.

Optionally, FIG. 8 is a schematic structural diagram illustrating a split-type detecting pile support. As shown in FIG. 8, the detecting pile support includes a plurality of split-type detecting pile supports 601. A detecting unit 302 is fastened to a side wall of each split-type detecting pile support 601. All detecting units 302 are electrically connected together through cables. One side of the split-type detecting pile support 601 may be disposed with a detecting unit 302, and another side of the split-type detecting pile support 601 may be fastened to a vertical surface. The bottom of the split-type detecting pile support 601 may be fastened to a horizontal surface.

The split-type detecting pile 601 provided by this alternative example is convenient for flexible and efficient arrangement of each detecting unit when there is a building structure or a piece of furniture hindering the detecting range of the detecting unit 302.

The detecting pile provided in the third embodiment is convenient for an installer to arrange the detecting unit 302 for detecting human body presentation information of a care recipient, and improves the efficiency and convenience of installing the detecting unit 302.

Figure 9:
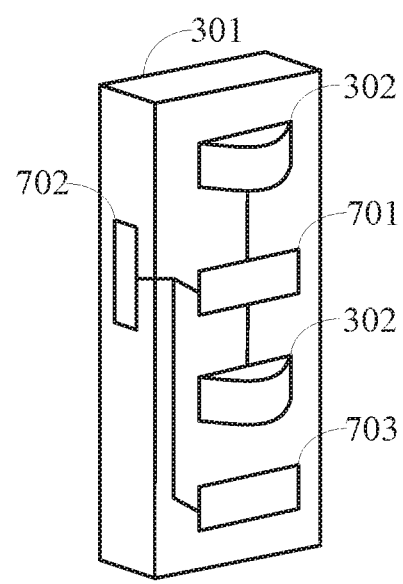
FIG. 9 is a schematic structural diagram illustrating a detecting pile according to a fourth embodiment.

FIG. 9 is a schematic structural diagram illustrating a detecting pile according to the fourth embodiment. As shown in FIG. 9, the detecting pile further includes a first processing unit 701 and a first communication unit 702.

The first processing unit 701 is disposed on the detecting pile support 301 and is connected to the detecting units 302 on the detecting pile support 301 respectively. The first processing unit 701 is connected to the first communication unit 702. The first communication unit 702 is disposed on the detecting pile support 301. The first processing unit 701 is configured to obtain a presentation information code according to the human body presentation information in each preset height section, and transmit out the presentation information code through the first communication unit 702.

In an alternative example, the first processing unit 701 is configured to obtain a presentation information code according to the human body presentation information in each preset height section. The first processing unit 701 is also configured to record the duration in which the presentation information code is in a matching state with the target code when the presentation information code is in the matching state with the target code. The first processing unit 701 is further configured to generate a help-seeking message when the duration is greater than the time threshold corresponding to the target code, and send out the help-seeking message through the first communication unit 702. The time threshold corresponds to the target code.

In an alternative example, as shown in FIG. 9, the detecting pile according to the fourth embodiment further includes a working environment state monitoring unit 703.

The working environment state monitoring unit 703 is connected to the first processing unit 701, and is configured to monitor self-operation guarantee of the system and an environmental state of the care area, and sends abnormal state information that appears in the working environment to the first processing unit 701 in time. When prompt information is generated in the first processing unit 701, the abnormal environment state information is also sent out through the first communication unit 702.

The working environment state monitoring unit is a power supply monitoring device, a temperature detecting device, an external obstacle detecting device, a fuel gas detecting device, and a smoke detecting device.

The detecting pile provided in the fourth embodiment integrates the detecting unit 302, the first processing unit 701, the first communication unit 702, and the working environment state monitoring unit 703, which has a complete independent operation capability and is convenient for multi-point arrangement. The presentation information code obtained by combining the human body presentation information detected by the detecting unit 302 with the address information is transmitted to the external host device in time for centralized processing (the host device records the duration in which each presentation information code is in a matching state with the target code, and then compares the duration with the time threshold corresponding to the target code), which is capable of finding out in time whether the behavior state of a person indoors is currently in danger or abnormal. If the host device can immediately report to external family members or full-time caregivers for checking and confirmation, then the elder who is really in an unexpected situation can be helped in time and the safety insurance of the elder while living alone can be effectively improved.

Figure 10:
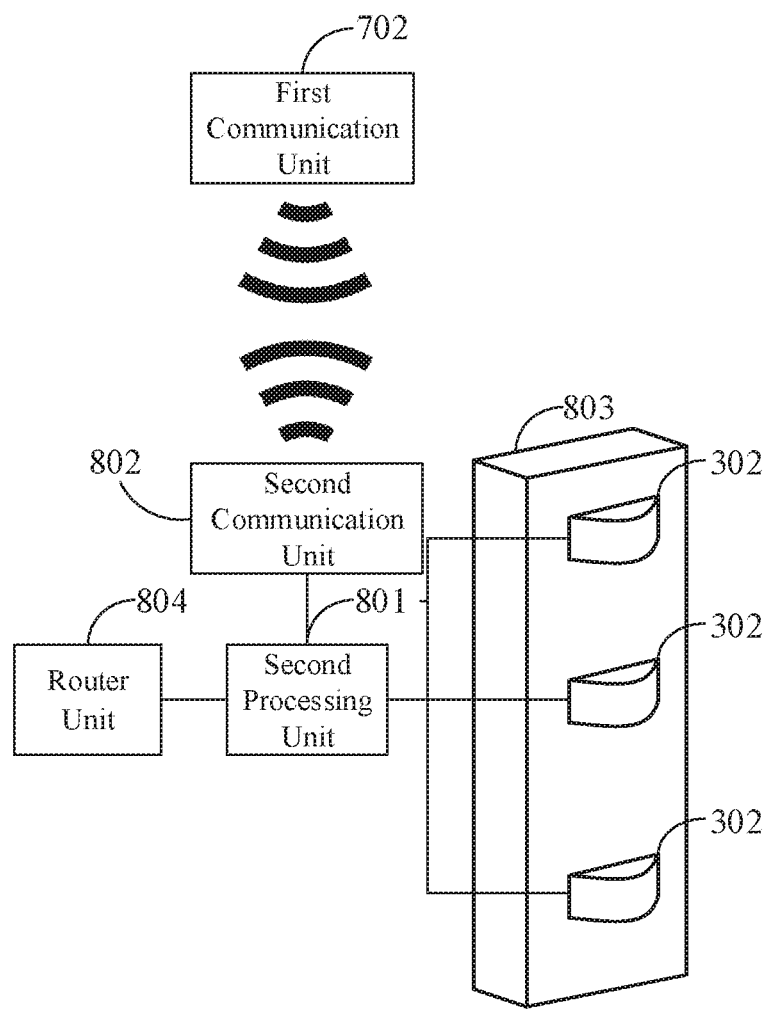
FIG. 10 is a schematic diagram illustrating a help-seeking system for indoor care according to a fifth embodiment.

FIG. 10 is a schematic diagram illustrating a help-seeking system for indoor care according to the fifth embodiment. As shown in FIG. 10, the system includes a second processing unit 801, a second communication unit 802, and a detecting pile support 803. The second processing unit 801 is connected to the second communication unit 802 and connected to the detecting units 302 respectively. Each detecting unit 302 is configured to detect the human body presentation information of a respective preset height section. The second processing unit 801 is configured to obtain the presentation information code according to the human body presentation information in each preset height section obtained by the detecting unit 302. The second processing unit 801 is also configured to record the duration in which the presentation information code is in a matching state with the target code when the presentation information code is in the matching state with the target code. The second processing unit 801 is further configured to generate a help-seeking message when the duration is greater than the time threshold corresponding to the target code and send out the help-seeking message through the second communication unit 802. The time threshold corresponds to the target code.

In an alternative example, as shown in FIG. 10, the second communication unit 802 is further configured to collect the presentation information code transmitted by the first communication unit 702, and simultaneously transmit the presentation information code to the second processing unit 801. The second processing unit 801 is configured to record a duration in which the received presentation information code is in a matching state with the target code when the presentation information code transmitted by the second communication unit 802 is in the matching state with the target code. The second processing unit 801 is also configured to generate a help-seeking message and send out the help-seeking message through the second communication unit 802 or the router unit 804 when the duration is greater than the time threshold corresponding to the target code. The time threshold corresponds to the target code.

In an alternative example, as shown in FIG. 10, the help-seeking system for indoor care according to the fifth embodiment further includes a router unit 804. The router unit 804 is connected to an external network and is also connected to the second processing unit 801. The second processing unit 801 is configured to enable interconnection communication between the router unit 804 and an external network over a permitted period of time when the help-seeking message is generated, thereby transmitting the help-seeking message to the external network and enabling an indoor audio/video monitoring device connected to the router unit 804 to transmit indoor video and indoor-outdoor audio information to the external network during the permitted period of time. The router unit 803 is not in the interconnection communication with the external network during a time other than the permitted period of time, except for communication monitoring to avoid network disconnection.

The router unit 804 is connected to the external network, so that external personnel can obtain help-seeking message through network, and can use the connected audio/video device to check the indoor conditions and perform two-way voice calls to determine whether to rush to the scene for assistance.

The second processing unit 801 may be a general-purpose processor, such as a DSP processor, The second communication unit 802 includes a receiving or transmitting module for various kinds of wireless codes, such as a rolling code, and also includes a communication module such as 3G/4G, a Wi-Fi communication module, or a satellite communication module. Preferably, the second communication unit 802 is further configured to connect with the server and send the help-seeking message to the server, so that relevant personnel can acquire the help-seeking message through the server.

With the help-seeking system for indoor care provided in the fifth embodiment, the detecting unit 302 acquires human body presentation information in each preset height section, the second processing unit 801 obtains a presentation information code according to the human body presentation information, records a duration in which the presentation information code is in a matching state with the target code, compare the duration with a time threshold corresponding to the target code, and generate a help-seeking message when the duration is greater than the time threshold. The help-seeking message is sent out through the router unit 804 or the second communication unit 802. Accordingly, all possible behavioral postures of a human body in daily activities are converted into and represented by target codes, and the target codes are associated with time (with a set reasonable time threshold), the allowable maximum duration (threshold value) for various kinds of behavioral postures of the human body in daily indoor activities can be used to compare with the duration of the individual's indoor activity behaviors. When there is a dangerous or abnormal behavioral posture with a duration greater than the time threshold, the help-seeking message is sent out to inform external personnel to check and confirm (via video or audio device) in time to determine whether assistance is needed. In this way, the efficient use of indoor unattended care and the external all-day attend/assistance can be achieved, which effectively improves the safety insurance of the elder while living alone.

Figure 11:
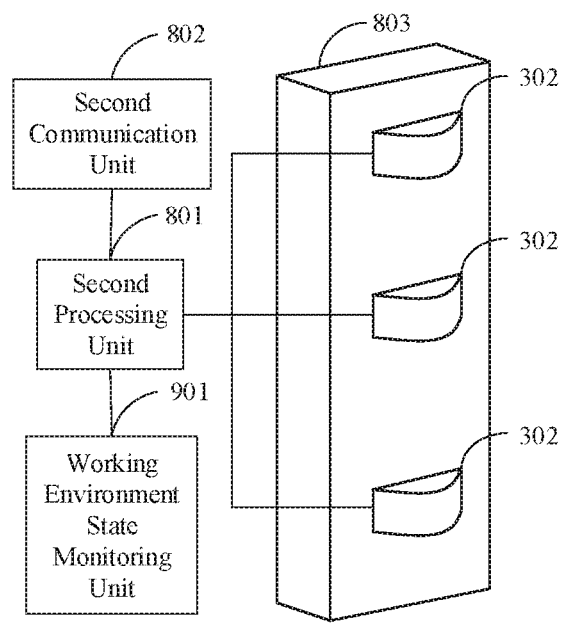
FIG. 11 is a schematic diagram illustrating a help-seeking system for indoor care according to a sixth embodiment.

FIG. 11 is a schematic diagram illustrating a help-seeking system for indoor care according to the sixth embodiment. As shown in FIG. 11, the help-seeking system for indoor care further includes a working environment state monitoring unit 901.

The working environment state monitoring unit 901 is connected to the second processing unit 801, and is configured to monitor the self-operation guarantee of the system and the environmental state of the care area, and transmits information about abnormal working environment state to the second processing unit 801, so as to make the second processing unit 801 to generate prompt information and send out the prompt information through the second communication unit.

The help-seeking system for indoor care provided in the sixth embodiment can detect in time whether the operating environment inside or outside the system is abnormal through the cooperation with the working environment state monitoring unit 901 and can report in time to external caregivers to verify or offer assistance when the environment state is abnormal or dangerous, so as to fully guarantee the effective operation of the system. Of course, it is also possible to use the network at the same time to warm indoor personnel (when there is high temperature, gas overflow; and fire) to avoid danger by themselves through the indoor audio/video device, and rush to the scene to help them escape when necessary, so as to effectively improve the safety insurance of the elder while living alone.

Figure 12:
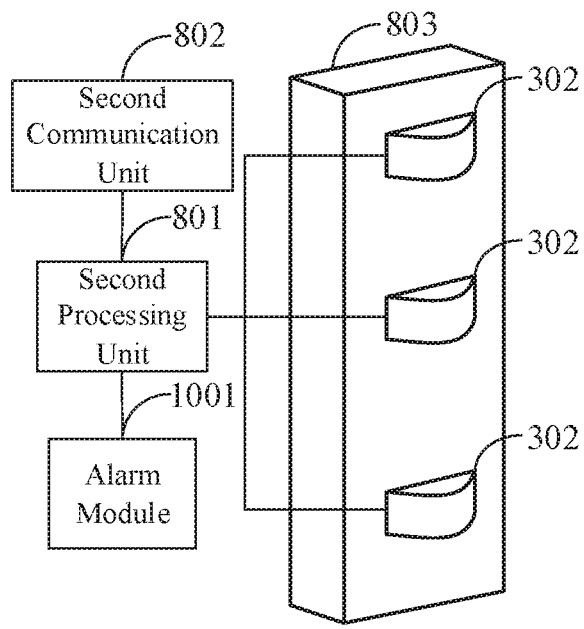
FIG. 12 is a block diagram illustrating the help-seeking system for indoor care according to the sixth embodiment.

FIG. 12 is a block diagram illustrating the help-seeking system for indoor care according to the sixth embodiment. As shown in FIG. 12, the help-seeking system for indoor care further includes an alarm module 1001. The alarm module 1001 is connected to the second processing unit 801, and the second processing unit 801 is connected to the second communication unit 802 and is configured to generate an alarm signal according to the help-seeking message transmitted by the second processing unit 801.

The alarm signal includes an indoor alarm signal and an outdoor alarm signal, such as a warning sound or light signal, and various kinds of prompt audios. The indoor alarm signal is used to warm the indoor care recipient, and it can also provide verification and guidance for external personnel. If there is an error in the help-seeking message, it will be convenient for the caregivers to respond in time and stop the alarm. The outdoor alarm signal is used to warm outdoor caregivers. For example, it can be a broadcast signal disposed in a public place in a community to warm outdoor related personnel to verify and offer assistance.

Figure 13:
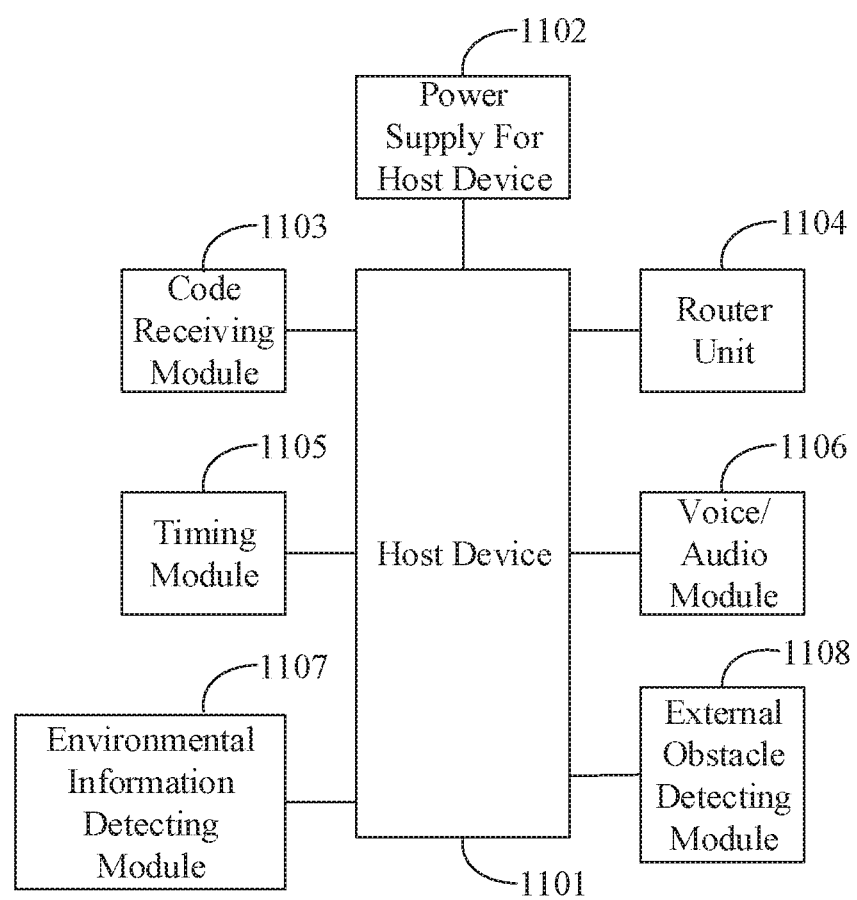
FIG. 13 is a circuit schematic diagram illustrating a help-seeking system for indoor care according to a specific application example.

The help-seeking system for indoor care according to any one of the aforementioned embodiments is explained below through a specific application example. FIG. 13 is a circuit schematic diagram illustrating a help-seeking system for indoor care according to a specific application example, and the circuit shown in FIG. 13 is a circuit principle module based on a single-chip microcomputer, including a host device 1101, a host device power supply 1102, a code receiving module 1103, a router unit 1104, a timing module 1105, a voice/audio module 1106, and an environmental information detecting module 1107.

The host device 1101 is a single-chip microcomputer host device, while the code receiving module 1103, the router unit 1104, the timing module 1105, the voice/audio module 1106, and the environmental information detecting module 1107 may be peripheral circuits. The host device power supply 1102 may be an AC/DC power supply or a battery power supply. The code receiving module 1103 is configured to receive the human body presentation information code obtained by the detecting unit 302, and may be a wireless communication module or a wired communication module. The timing module 1105 is configured to record the duration in which the presentation information code is in a matching state with the target code, and may be a circuit such as a pulse timing. The voice/audio module 1106 is configured to broadcast alarms and information prompts, and may be an external loudspeaker. The environmental information detecting module 1107 is connected to the working environment state monitoring unit 901 and may be a peripheral circuit having an analog-to-digital conversion function.

In an alternative example, as shown in FIG. 13, the circuit of the help-seeking system for indoor care according to the specific application example further includes an external obstacle detecting module 1108. The external obstacle detecting module 1108 is connected to the host device 1101, and configured to generate a report information and send the report information to the host device 1101 when an obstacle with a large volume/area appears in front of the detecting unit and may hinder the detecting unit from working. The host device 1101 can control the voice/audio module 1106 to play a voice according to the report information to prompt the user to remove/eliminate the obstacle. At the same time, the host device can also send the report information to the external caregivers through the router unit 1104 for attention and investigation in time, so as to avoid the care system from being in a state of continuous failure.

The technical features of the aforementioned embodiments can be arbitrarily combined. In order to make the description concise, not all possible combinations of the technical features in the aforementioned embodiments have been described. However, as long as there is no contradiction in the combination of these technical features, they should be considered to be the range described in the present specification.

The aforementioned examples only express several examples of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure. Therefore, the protection scope of the present disclosure shall be subject to the appended claims.

What is claimed is:

1. A help-seeking method for indoor care, comprising:
acquiring human body presentation information in each preset height section;
obtaining a presentation information code according to the human body presentation information in each preset height section;
recording a duration in which the presentation information code is in a matching state with a target code; and
generating a help-seeking message if the duration is greater than a time threshold corresponding to the target code;
wherein the target code includes a first code and a second code; and
wherein the recording the duration in which the presentation information code is in the matching state with the target code includes:
continuing to record a duration in which the presentation information code is in a matching state with the second code if the presentation information code changes from being in the matching state with the first code to being in the matching state with the second code, wherein a time threshold corresponding to the second code corresponds to the first code.

2. The help-seeking method of claim 1, wherein the obtaining the presentation information code according to the human body presentation information in each preset height section includes:
acquiring address information; and
combining the address information with the human body presentation information to obtain the presentation information code.

3. The help-seeking method of claim 1, wherein the human body presentation information includes human body infrared radiation information.

4. The help-seeking method of claim 1, wherein the help-seeking message corresponds to the target code.

5. A computer device, comprising a memory, a processor and a computer program stored on the memory, the computer program being executable by the processor and when executed, causing the processor to implement the help-seeking method of claim 1.

6. A non-transitory computer-readable storage medium, storing a computer program that, when executed, causes a processor to implement the help-seeking method of claim 1.

7. A detecting pile for implementing the help-seeking method of claim 1, comprising:
a detecting pile support; and
at least one detecting unit disposed on the detecting pile support,
wherein each of the at least one detecting unit is configured to detect human body presentation information for a corresponding preset height section.

8. The detecting pile of claim 7, wherein:
the detecting pile support includes a plurality of split-type detecting pile supports;
one of the at least one detecting unit is fastened to a corresponding one of the plurality of split-type detecting pile supports; and
the plurality of split-type detecting pile supports are electrically connected to each other through cables.

9. The detecting pile of claim 7, wherein:
the detecting unit includes a curtain-type infrared probe;
the curtain-type infrared probe includes a light condensing window made up of an annular focal pointing support and a lens fastened along an annular surface of the annular focal pointing support; and a sensor configured to detect human body presentation information is disposed at a focal point of the annular focal pointing support.

10. The detecting pile of claim 9, wherein the lens of the curtain-type infrared probe includes a Fresnel lens.

11. The detecting pile of claim 9, wherein the sensor of the curtain-type infrared probe includes a pyroelectric infrared sensor.

12. The detecting pile of claim 7, wherein the detecting unit includes:

a non-curtain-type probe; and a shielding structure, disposed outside the non-curtain-type probe, and configured to limit a certain detection range of the non-curtain-type probe.

13. The detecting pile of claim 12, wherein the non-curtain-type probe has a sensor including a pyroelectric infrared sensor.

14. The detecting pile of claim 7, further comprising:

a first processing unit, disposed on the detecting pile support, and connected to the at least one detecting unit on the detecting pile support respectively; and a first communication unit, disposed on the detecting pile support, wherein the first processing unit is configured to obtain a presentation information code according to the human body presentation information in the preset height section acquired by each of the at least one detecting unit, and transmit the presentation information code through the first communication unit.

15. The detecting pile of claim 14, wherein the first processing unit is further configured to:

record a duration in which the presentation information code is in a matching state with a target code when the presentation information code is in the matching state with the target code;

generate a help-seeking message when the duration is greater than a time threshold corresponding to the target code; and send out the help-seeking message through the first communication unit.

16. A help-seeking system for indoor care, comprising:

the detecting pile of claim 14;

a second communication unit; and a second processing unit, connected to the second communication unit and the at least one detecting unit respectively, and configured to:

obtain a presentation information code according to the human body presentation information in each preset height section;

record a duration in which the presentation information code is in a matching state with a target code when the presentation information code is in the matching state with the target code;

generate a help-seeking message when the duration is greater than a time threshold corresponding to the target code; and send out the help-seeking message through the second communication unit.

17. The help-seeking system of claim 16, wherein the second communication unit is configured to collect the presentation information code transmitted by the first communication unit.

18. The help-seeking system of claim 16, further comprising:

an alarm module, connected to the second processing unit, and configured to generate an alarm signal according to the help-seeking message.

19. The help-seeking system of claim 16, further comprising:

a working environment state monitoring unit, connected to the second processing unit, and configured to monitor self-operation guarantee of the help-seeking system and an environmental state of a care area, and transmit state abnormality information that appears in the working environment of the help-seeking system to the second processing unit, so that the second processing unit generates prompt information and sends out the state abnormality information through the second communication unit.

20. The help-seeking system of claim 19, wherein the working environment state monitoring unit includes a power supply monitoring device, a temperature detecting device, an external obstacle detecting device, a gas detecting device, and a smoke detecting device.

21. The help-seeking system of claim 16, further comprising:

a router unit, connected to the second processing unit, wherein the second processing unit is further configured to, when generating the help-seeking message, enable interconnection communication between the router unit and an external network over a permitted period of time, so that the second communication unit and an indoor audio/video monitoring device connected to the router unit are allowed to send the help-seeking message and audio/video information of an indoor scene respectively to the external network through the router unit during the permitted period of time, and wherein the router unit is not in the interconnection communication with the external network during a time other than the permitted period of time.

* * * * *